United States Patent [19]

Takeda et al.

[11] Patent Number: 5,621,254

[45] Date of Patent: Apr. 15, 1997

[54] UNINTERRUPTIBLE POWER SWITCHING METHOD AND APPARATUS

[75] Inventors: Kaizo Takeda; Kano Otani; Hisayuki Nagase, all of Aichi-ken, Japan

[73] Assignee: Kabushiki Kaisha Aichi Denki Seisakusho, Nagoya, Japan

[21] Appl. No.: 534,657

[22] Filed: Sep. 27, 1995

[51] Int. Cl.$^6$ ........................................ H02J 7/00
[52] U.S. Cl. .................. 307/64; 307/43; 307/44; 307/85; 307/86; 307/80; 307/81; 307/70; 307/116; 307/125
[58] Field of Search .................. 307/64, 43, 44, 307/85, 86, 80, 81, 70, 116, 125

[56] References Cited

U.S. PATENT DOCUMENTS

| | | | |
|---|---|---|---|
| 4,641,042 | 2/1987 | Miyazawa | 307/66 |
| 5,278,453 | 1/1994 | Pollmeier | 307/44 |

FOREIGN PATENT DOCUMENTS 3-163716  7/1991  Japan .

Primary Examiner—William M. Shoop, Jr.
Assistant Examiner—Kim Lockett
Attorney, Agent, or Firm—Jacobson, Price, Holman & Stern, PLLC

[57] ABSTRACT

A change-over switch performs switching between two different power supplies after connecting both power supplies simultaneously for a given time period. A controller controls the change-over switch to perform the switching operation around a synchronous point of the power supplies. Voltages of the power supplies are monitored to derive a difference voltage therebetween. From the difference voltage, a phase difference between the voltages of the power supplies is monitored. A plurality of low voltage detectors are provided for monitoring the difference voltage. The low voltage detectors are arranged to be operated at voltage values no more than preset values, respectively. The controller outputs a switching command to the change-over switch when time intervals between adjacent operation start time points of the low voltage detectors are all greater than preset values, respectively, and when the low voltage detectors are all operated. The controller controls the switching operation of the change-over switch while the monitored voltages of the power supplies are within a preset range.

6 Claims, 10 Drawing Sheets

5,621,254

UNINTERRUPTIBLE POWER SWITCHING METHOD AND APPARATUS

BACKGROUND OF THE INVENTION

1. Field of the Invention

The present invention relates to a method of and an apparatus for performing switching between two different power supplies around their synchronous point with no interruption, using an overlap-type change-over switch which performs switching between the power supplies after connecting both of them simultaneously for a given time period.

2. Description of the Prior Art

In a conventional uninterruptible power supply unit or the like which performs switching between two different power supplies with no interruption, an automatically-synchronizing closing device has been used which achieves switching between the power supplies by executing adjustments in voltage value and phase between the power supplies so as to ensure precise synchronization therebetween.

Accordingly, the foregoing conventional automatically-synchronizing closing device is provided with functions of executing the voltage value and frequency controls, which, however, inevitably render the device complicated in structure and thus expensive.

SUMMARY OF THE INVENTION

Therefore, it is an object of the present invention to provide an uninterruptible power switching method and an apparatus therefor which are simple in structure and inexpensive, and which, on the assumption that adjustments in voltage value and frequency between two different power supplies are executed separately, are capable of switching between the power supplies within given ranges of voltage difference and frequency difference therebetween which do not apply damage to either of the power supplies.

According to one aspect of the present invention, an uninterruptible power switching method for switching between two different power supplies without interruption using an overlap-type change-over switch which, in response to a switching command, switches between the power supplies after connecting both of them simultaneously for a given time period, comprises the steps of deriving a difference voltage between the power supplies; rectifying the difference voltage in full wave; and outputting the switching command to the change-over switch when a low voltage detector detects a low voltage value of the rectified voltage no more than a preset value over a preset time period while the rectified voltage gradually decreases to approach a minimum value.

According to another aspect of the present invention, an uninterruptible power switching method for switching between two different power supplies without interruption using an overlap-type change-over switch which, in response to a switching command, switches between the power supplies after connecting both of them simultaneously for a given time period, comprises the steps of monitoring voltages of the power supplies; deriving a difference voltage of the monitored voltages between the power supplies; rectifying the difference voltage in full wave; detecting low voltage values of the rectified voltage by a plurality of low voltage detectors in turn while the rectified voltage gradually decreases to approach a minimum value; and outputting the switching command to the change-over switch when the monitored voltages of the power supplies are within a preset range, when time intervals between adjacent operation start time points of the low voltage detectors are all greater than preset values, respectively, and when the low voltage detectors are all operated.

According to another aspect of the present invention, an uninterruptible power switching apparatus for controlling an overlap-type change-over switch which, In response to a switching command, switches between two different power supplies after connecting both of them simultaneously for a given time period, comprises instrument transformers for deriving a difference voltage of the power supplies; a rectifier for rectifying the difference voltage in full wave; a low voltage detector for producing an output signal when detecting a low voltage value of the rectified voltage from the rectifier no more than a preset value over a preset time period while the rectified voltage from the rectifier gradually decreases to approach a minimum value; and a controller for outputting the switching command to the change-over switch in response to the output signal from the low voltage detector.

According to another aspect of the present invention, an uninterruptible power switching apparatus for controlling an overlap-type change-over switch which, In response to a switching command, switches between two different power supplies after connecting both of them simultaneously for a given time period, comprises voltage detector units for outputting voltage-normal signals when voltages of the power supplies are within a preset range, respectively; instrument transformers for deriving a difference voltage between the power supplies; a rectifier for rectifying the difference voltage in full wave; a plurality of low voltage detectors for detecting low voltage values of the rectified voltage from the rectifier in turn while the rectified voltage from the rectifier gradually decreases to approach a minimum value; and a controller, in response to output signals from the low voltage detectors and the voltage-normal signals from the voltage detector units, for outputting the switching command to the change-over switch when time intervals between adjacent operation start time points of the low voltage detectors are all greater than preset values, respectively, and when the output signals are received from all of the low voltage detectors.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Figure 1:
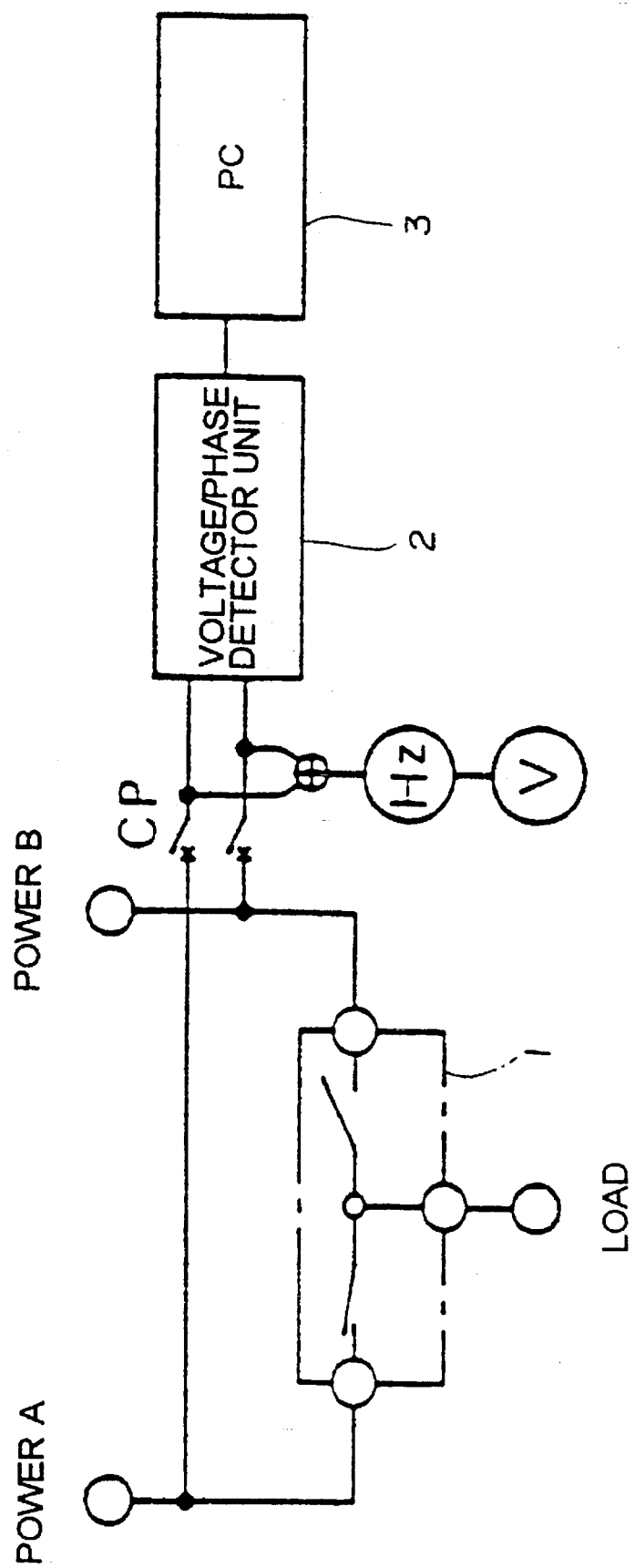
FIG. 1 is a schematic diagram of an uninterruptible power switching apparatus according to a preferred embodiment of the present invention.
Figure 2:
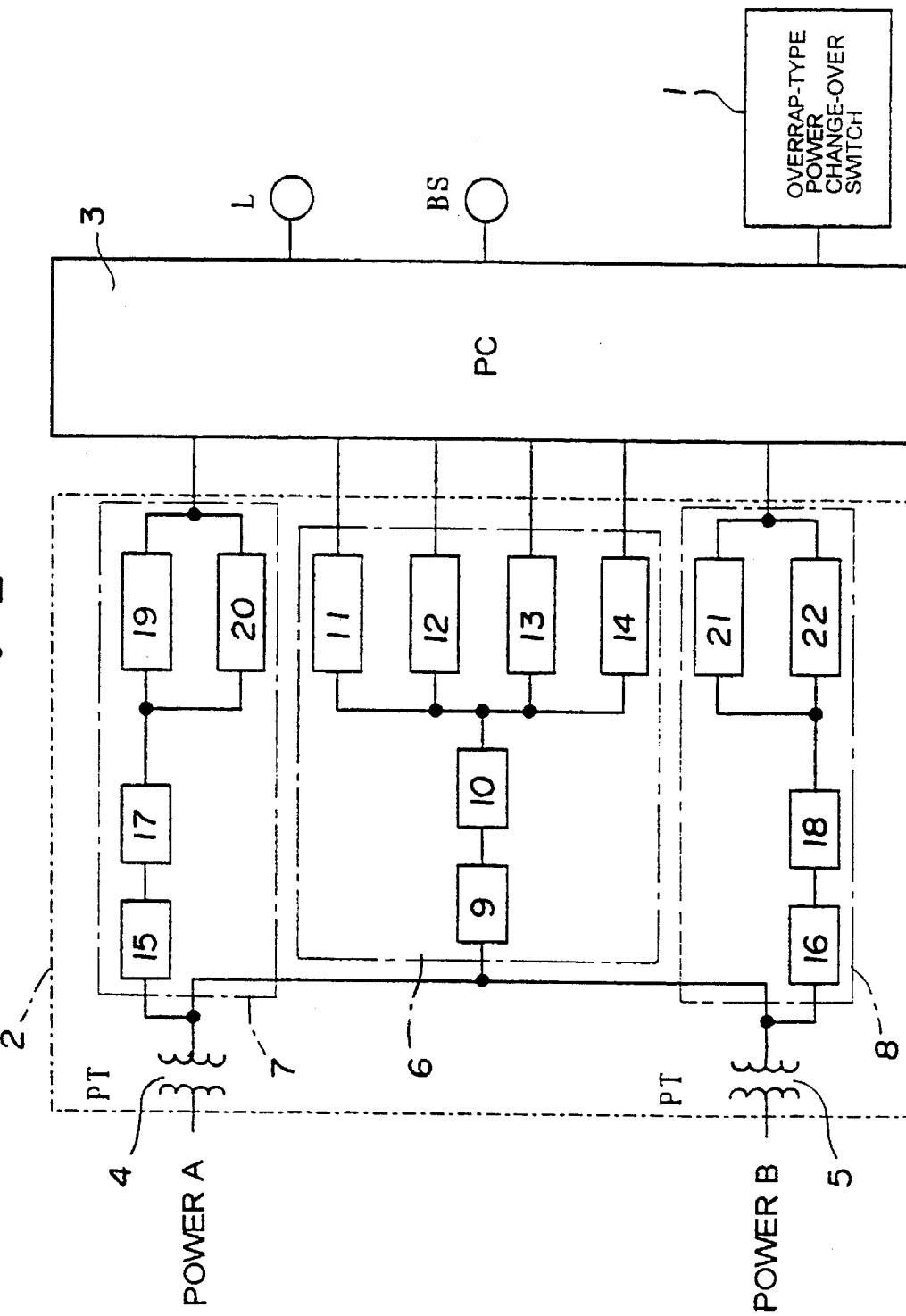
FIG. 2 is a control block diagram of the uninterruptible power switching apparatus shown in FIG. 1.

Now, a preferred embodiment of the present invention will be described hereinbelow with reference to the accompanying drawings, As shown in FIGS. 1 and 2, an uninterruptible power switching apparatus includes an overlap-type change-over switch 1 for selectively connecting a power supply A or B to a load, a voltage/phase detector unit 2 for detecting voltage values and voltage phases of the power supplies A and B, and a programmable controller (PC) 3 which receives detection data from the detector unit 2 and controls an operation of the change-over switch 1 based on the received data.

The change-over switch 1 is of a type which, In response to a switching command from the PC 3, performs switching between the power supplies A and B after connecting both of the power supplies A and B simultaneously for a given time period. As the change-over switch 1, for example, an overlap-type power change-over switch as disclosed in Japanese Patent Application No. 1-301476 (Japanese First (unexamined) Patent Publication No. 3-163716) may be used. The change-over switch 1 completes the switching between the power supplies A and B in a given short time period, such as, 0.3 seconds in response to the switching command from the PC 3. The uninterruptible power switching apparatus in this preferred embodiment aims to operate the change-over switch 1 around a synchronous point, that is, in a given range across the synchronous point, of the power supplies A and B where the power supply switching can be achieved without applying damage to either of the power supplies A and B. On the other hand, as described above, the change-over switch 1 requires a given operation time period from receipt of the switching command from the PC 3 to the completion of the switching operation. Accordingly, in this preferred embodiment, it is arranged that the switching command is issued with a certain margin so that the change-over switch 1 finishes the switching operation within the foregoing given range across the synchronous point.

Figure 3:
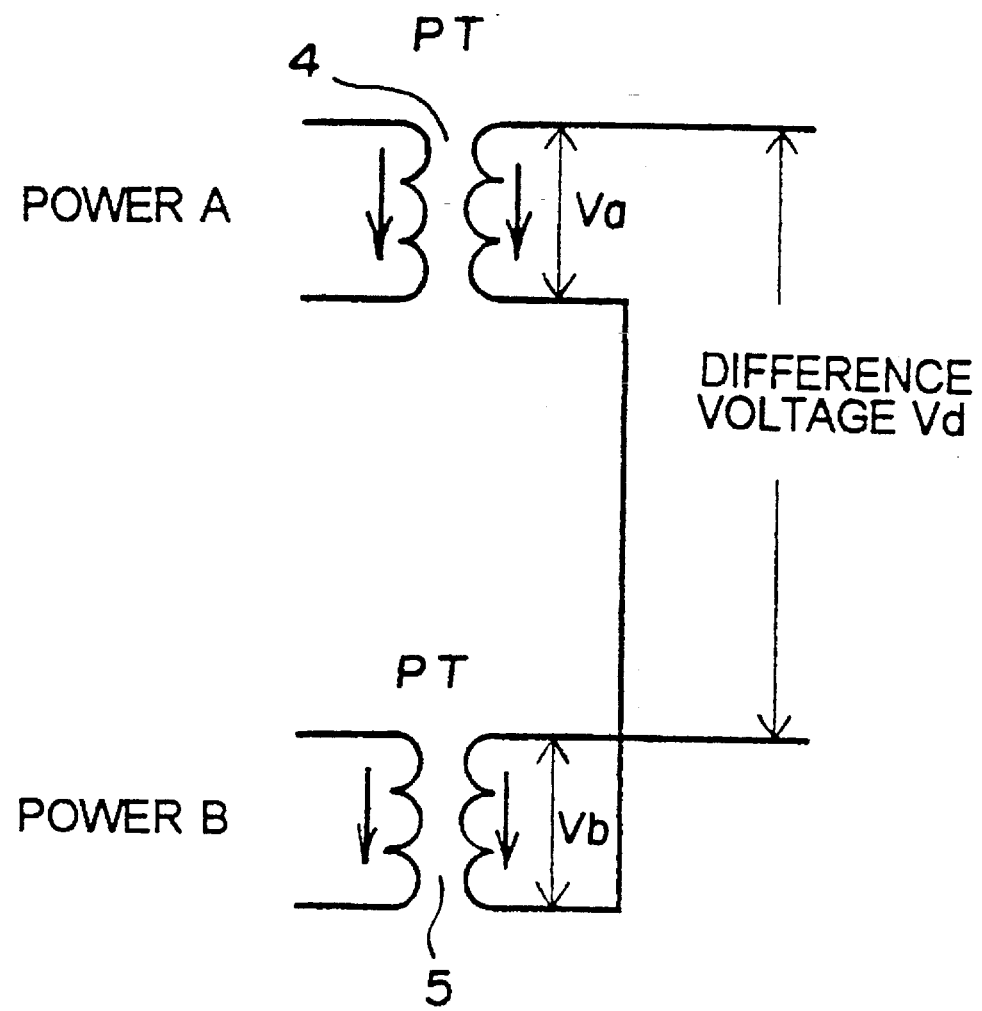
FIG. 3 is a circuit diagram of instrument transformers used in the uninterruptible power switching apparatus shown in FIG. 1.

As shown in FIGS. 2 and 3, the voltage/phase detector unit 2 includes instrument transformers 4 and 5 for deriving secondary voltages Va and Vb of the power supplies A and B, respectively, and a phase detector unit 6 for detecting a phase difference between the power supplies A and B based on a difference voltage Vd between the voltages Va and Vb derived via the instrument transformers 4 and 5. The detector unit 2 further includes voltage detector units 7 and 8 for monitoring the voltages Va and Vb derived via the instrument transformers 4 and 5, respectively.

The phase detector unit 6 includes a low-pass filter 9 for filtering the difference voltage Vd so as to eliminate high-frequency components which would otherwise cause operation failure. The phase detector unit 6 further includes a rectifier 10 for rectifying the difference voltage Vd in full wave, and a plurality of low voltage detectors 11, 12, 13 and 14 (or LV1, LV2, LV3 and LV4) which are operated by an output voltage from the rectifier 10. The low voltage detectors 11, 12, 13 and 14 are operated, respectively, in response to an applied voltage equal to or less than preset respective values.

Figure 4:
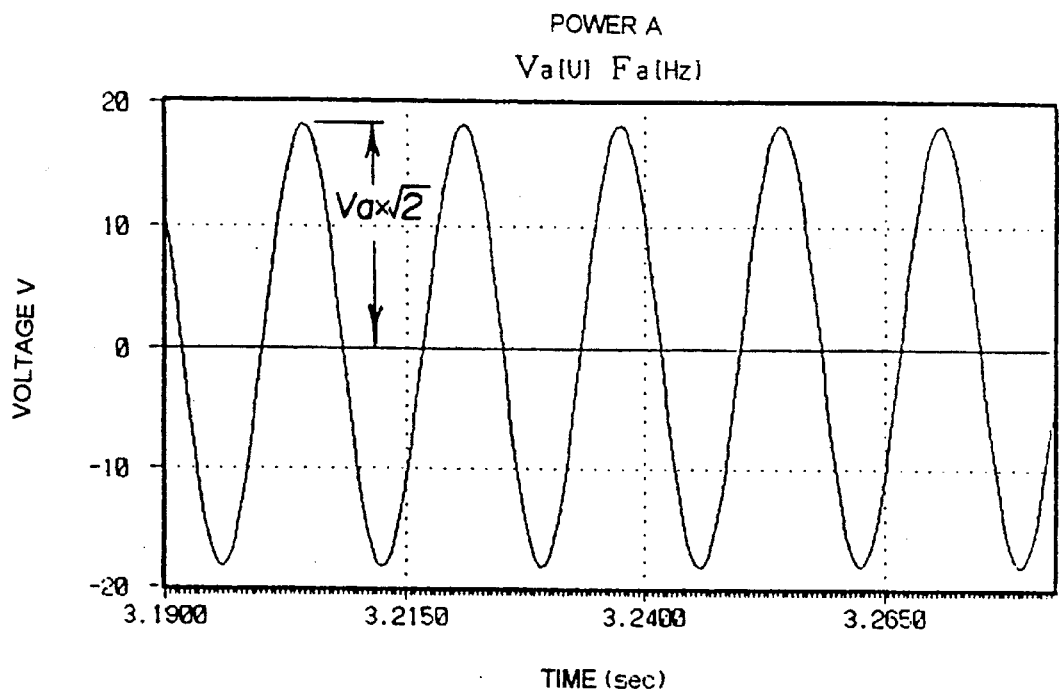
FIG. 4 is a graph showing a waveform of the output voltage of the instrument transformer at a side of a power supply A.
Figure 5:
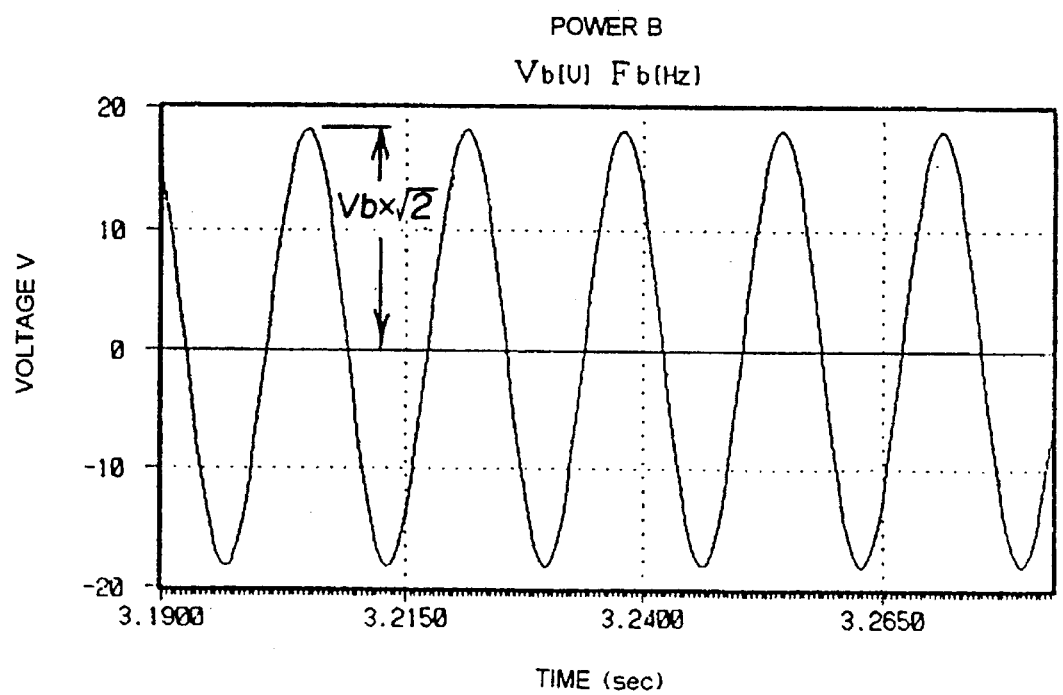
FIG. 5 is a graph showing a waveform of the output voltage of the instrument transformer at a side of a power supply B.
Figure 6:
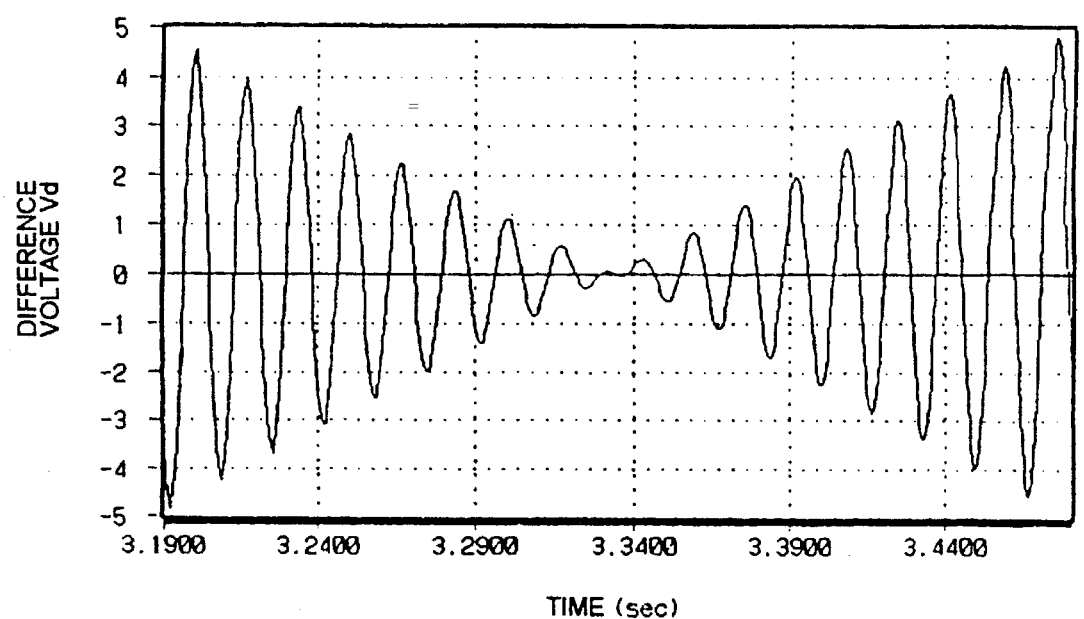
FIG. 6 is a graph showing a waveform of the difference voltage between the output voltages of the instrument trans
Figure 7:
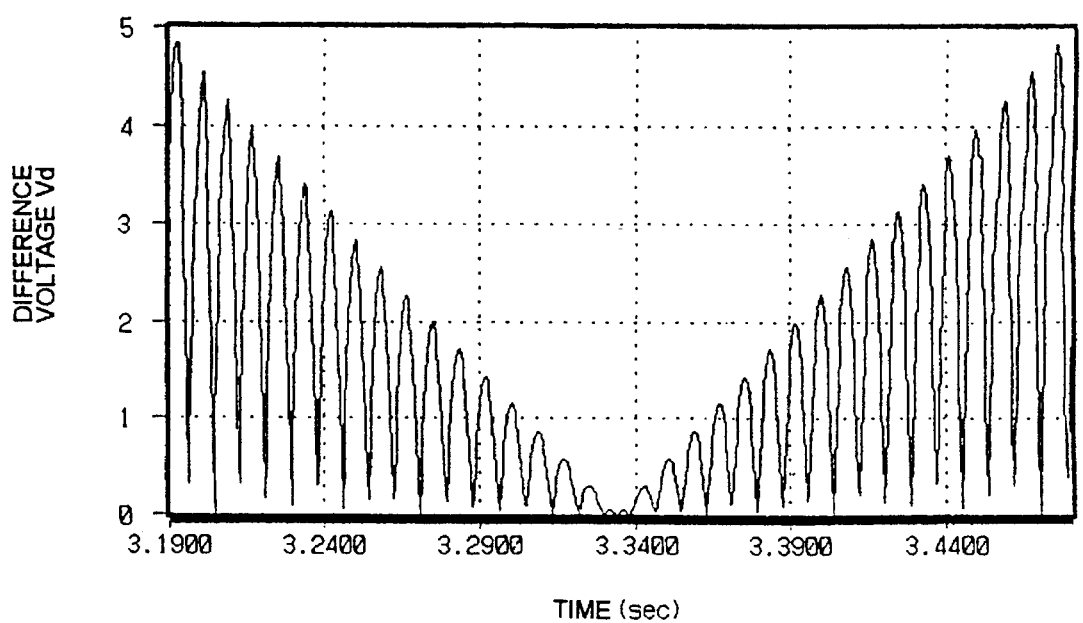
- FIG. 7 is a graph showing a waveform of the difference voltage between the output voltages of the instrument transformers at both sides of the power supplies A and B, wherein the difference voltage is rectified in full wave.
Figure 8:
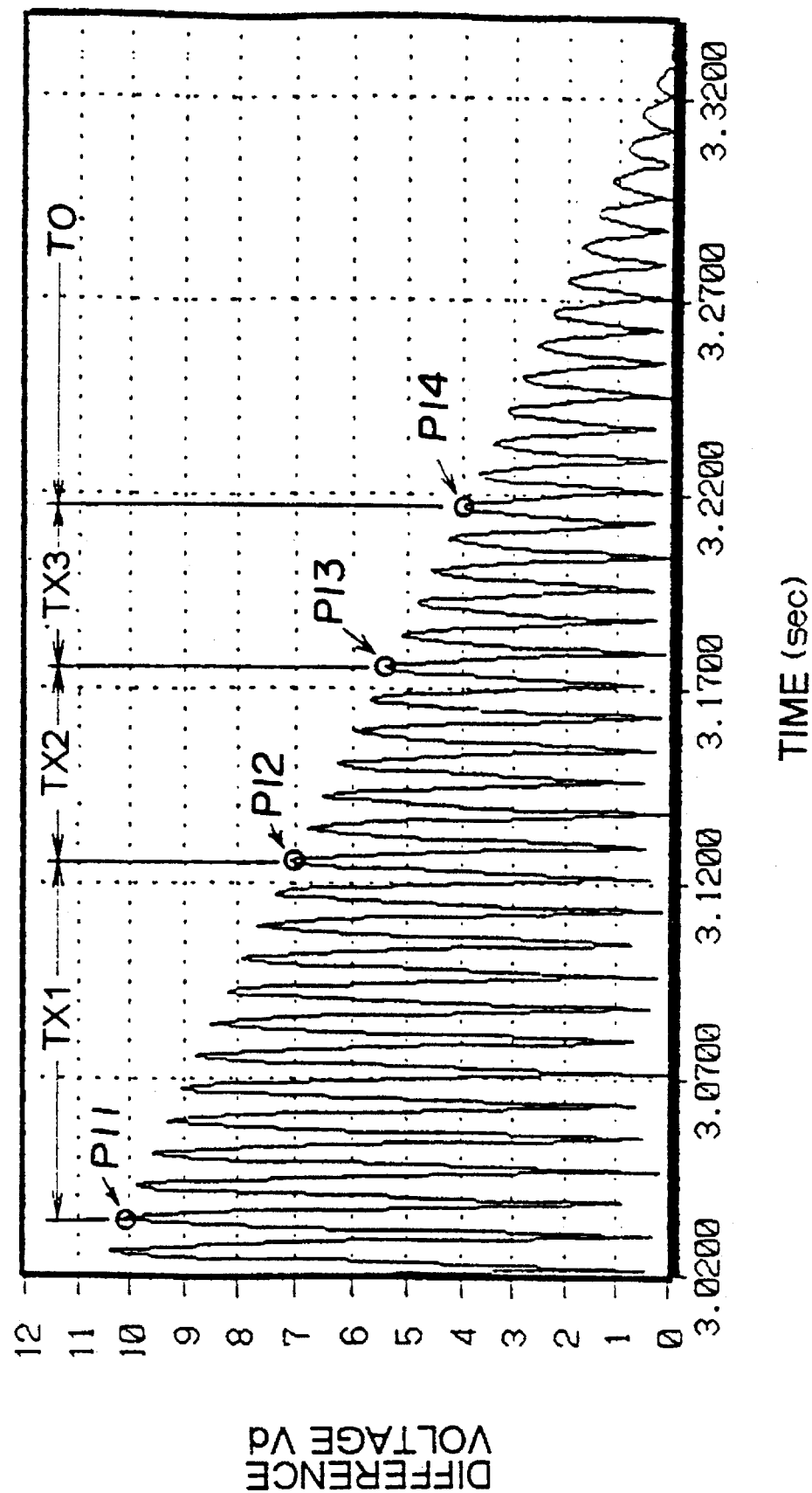
FIG. 8 is a graph showing a relationship between a waveform of the rectified difference voltage and operation timings of low voltage detectors.

FIGS. 4 and 5 show waveforms of the voltages Va and Vb derived via the instrument transformers 4 and 5, respectively. As seen from these figures, the voltages Va and Vb slightly differ from each other both in voltage value and frequency. FIG. 6 shows a waveform of the difference voltage Vd filtered through the low-pass filter 9, while FIG. 7 shows a waveform of the difference voltage Vd rectified in full wave through the rectifier 10. As shown in FIG. 8, at the synchronous point of the voltages Va and Vb, the difference voltage Vd becomes minimum. As further seen in the figure, before reaching the synchronous point, the difference voltage Vd gradually decreases at a relatively small inclination. As appreciated, the smaller inclination represents the smaller frequency difference. In FIG. 8, the low voltage detectors 11, 12, 13 and 14 start to be operated at voltage values P11, P12, P13 and P14, respectively. Accordingly, there exist time intervals TX1, TX2 and TX3 between operation start time points of the low voltage detectors 11 and 12, between operation start time points of the low voltage detectors 12 and 13 and between operation start time points of the low voltage detectors 13 and 14, respectively. As appreciated, as the time interval becomes greater, it represents the smaller frequency difference.

A phase difference θ4(°) within which the switching between the power supplies A and B can be performed, is determined in view of expected excess current due to the voltage difference and the phase difference of the power supplies A and B and a protective device therefor. Since a time Tx(sec) is necessary from the start of operation, that is, turning on, of the low voltage detector 14 to the completion of the switching operation of the change-over switch 1, a state of the phase difference no more than θ4 is necessary at least for the time Tx across the synchronous point. Since the time Tx is the sum of an operation time of a control relay between the PC 3 and the change-over switch 1 and a switching operation time of the change-over switch 1, a time T0(sec) for which the low voltage detector 14 remains to be turned on is set to Tx+α. α represents a margin time and is set in consideration of errors in operating voltages of the low voltage detectors 11–14 due to differences in supply voltages of the power supplies, delays in operation timings of the low voltage detectors 11–14 due to aged variations of the supply voltages and the like. A frequency difference Fx(Hz) between the power supplies A and B which can ensure the time T0 is derived by the following equation:

$$Fx = 2 \times \theta 4 / 360 \times T0$$

Specifically, a time no less than T0 can be achieved if a frequency difference between the power supplies is no more than Fx.

Figure 9:
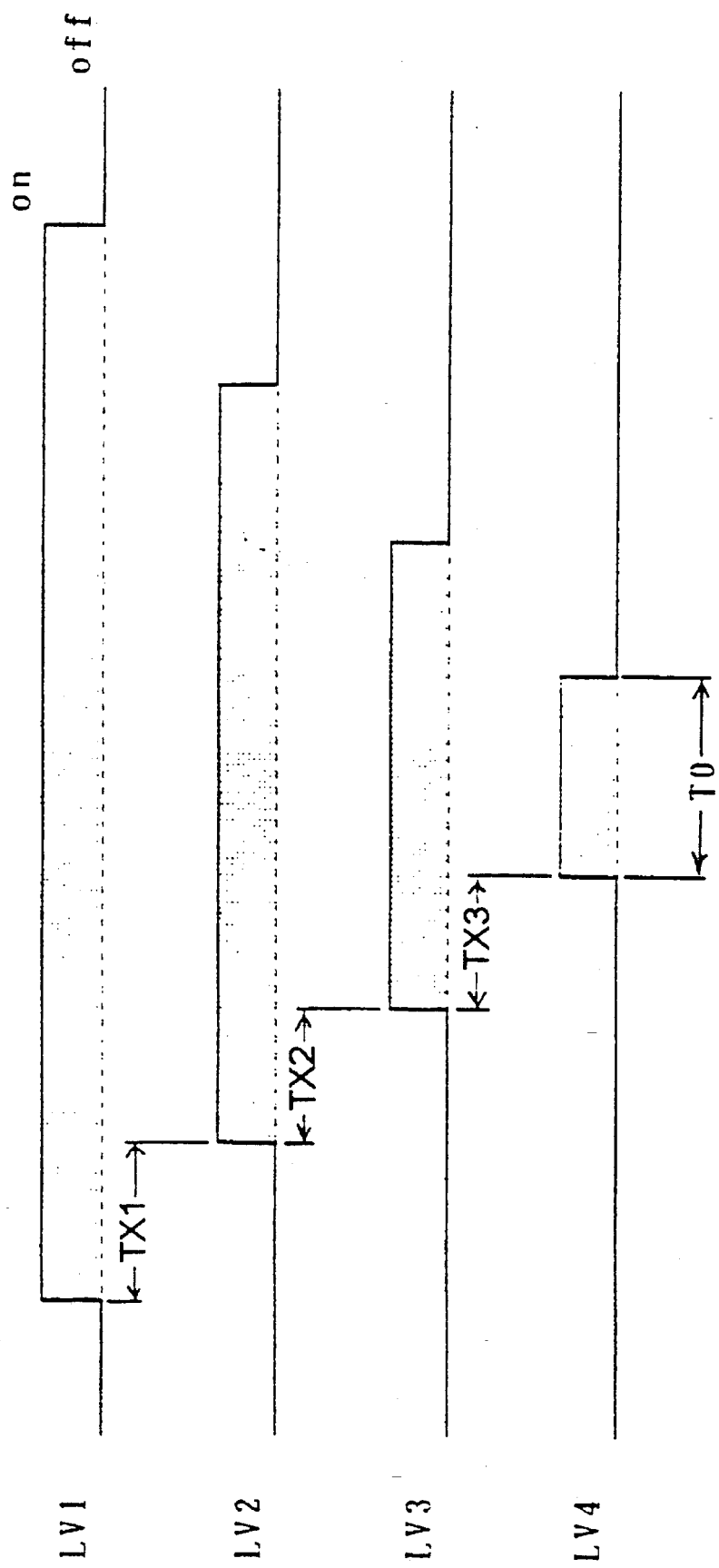
FIG. 9 is a time chart showing operations of the low voltage detectors.

Since time periods for which the low voltage detectors 11, 12, 13 and 14 remain turned on, respectively, that is, for which states of phase differences no more than θ1, θ2, θ3, and θ4, continue across the synchronous point, respectively, decrease in the order named as shown in FIG. 9, the time intervals TX1, TX2 and TX3 between the operation start time points of the low voltage detectors 11–14 are derived by the following equations:

$$TX1 = \theta1 - \theta2/360 \times Fx$$
$$TX2 = \theta2 - \theta3/360 \times Fx$$
$$TX3 = \theta3 - \theta4/360 \times Fx$$

Accordingly, the operating voltage values P11, P12, P13 and P14 are determined by the following equations:

$$P11 = Va \times \sqrt{2} \times \sin\theta1$$

$$P12 = Va \times \sqrt{2} \times \sin\theta2$$

$$P13 = Va \times \sqrt{2} \times \sin\theta3$$

$$P14 = Va \times \sqrt{2} \times \sin\theta4$$

wherein it is assumed that VA=VB for simplification.

Figure 10:
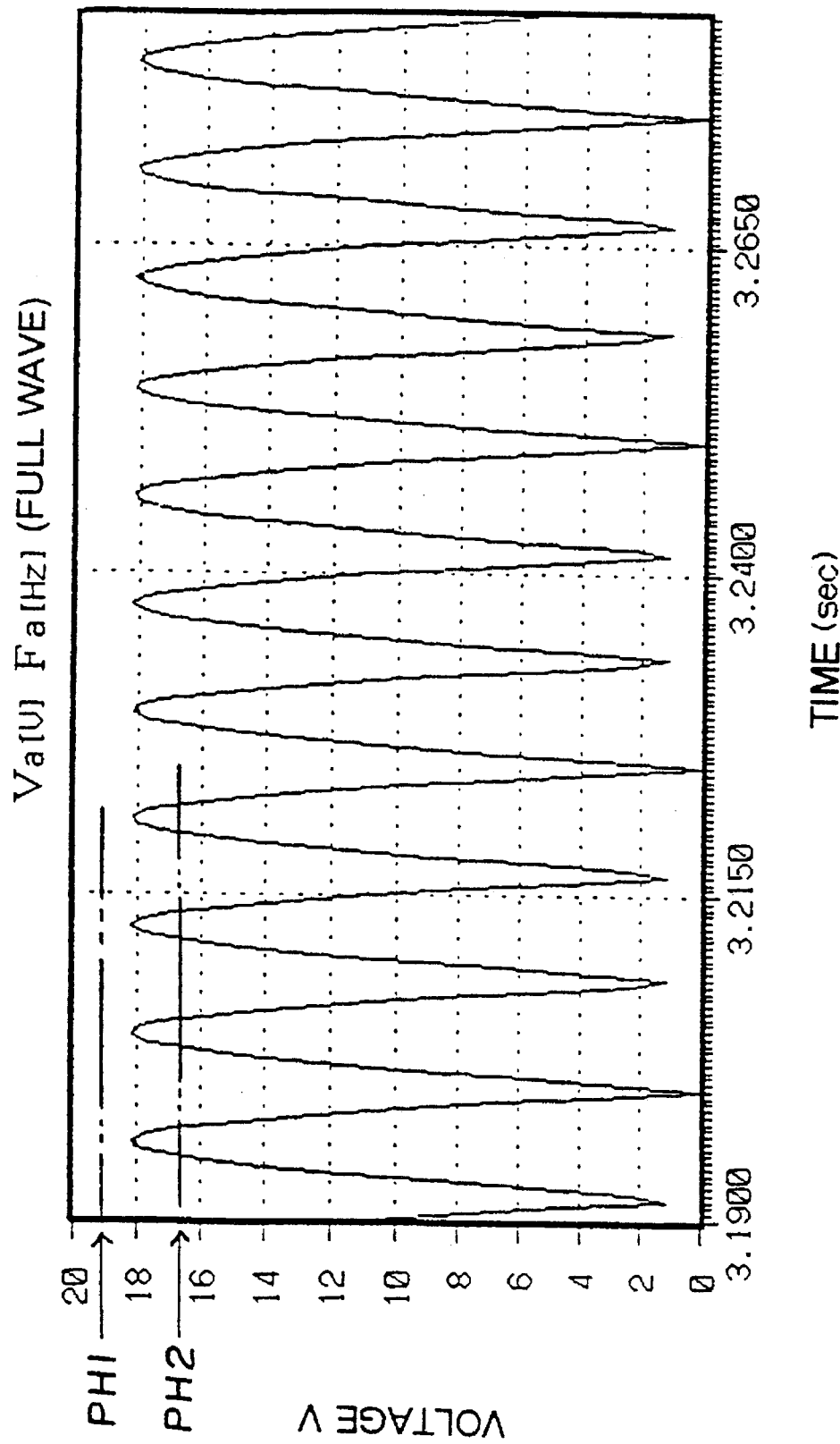
FIG. 10 is a graph showing a relationship between a waveform of the output voltage of the instrument transformer at the side of the power supply A which has been filtered and rectified in full wave, and operations of voltage detectors.

The voltage detector units 7 and 8 output voltage-normal signals to the PC 3, respectively, when the voltages of the power supplies A and B are within a preset range, respectively. Specifically, the voltage detector units 7 and 8 include low-pass filters 15 and 16 for filtering the voltages Va and Vb of the power supplies A and B derived via the instrument transformers 4 and 5, respectively, rectifiers 17 and 18 for rectifying the filtered voltages Va and Vb in full wave, respectively, and voltage detectors 19, 20, (or HV1, HV2) and 21, 22 (or HV3, HV4) for monitoring the output voltages from the rectifiers 17 and 18, respectively. FIG. 10 shows a waveform of the voltage Va filtered through the low-pass filter 15 and rectified through the rectifier 17 in full wave. The voltage detector 19 turns on at a voltage value no more than PH1, while the voltage detector 20, turns on at a voltage value no more than PH2. When the voltage detector 19 is on and the voltage detector 20, is off, the voltage Va is normal. On the other hand, when the voltage detectors 19 and 20, are both on, the voltage Va is abnormal in lower limit, while, when the voltage detectors 19 and 20, are both off, the voltage Va is abnormal in upper limit. The voltage detector unit 7 is arranged to output a voltage-normal signal to the PC 3 only when the voltage detector 19 is on and the voltage detector 20, is off Similarly, the voltage detector unit 8 is arranged to output a voltage-normal signal to the PC 3 only when the voltage Vb is within the preset range.

In response to the output signals from the low voltage detectors 11, 12, 13 and 14 and the voltage-normal signals from the voltage detector units 7 and 8, the PC 3 outputs the switching command to the change-over switch 1 when the time intervals TX1, TX2 and TX3 are all no less than preset values, respectively, and in addition, when the output signals each indicative of an on states are received from all the low voltage detectors 11, 12, 13 and 14.

Figure 11:
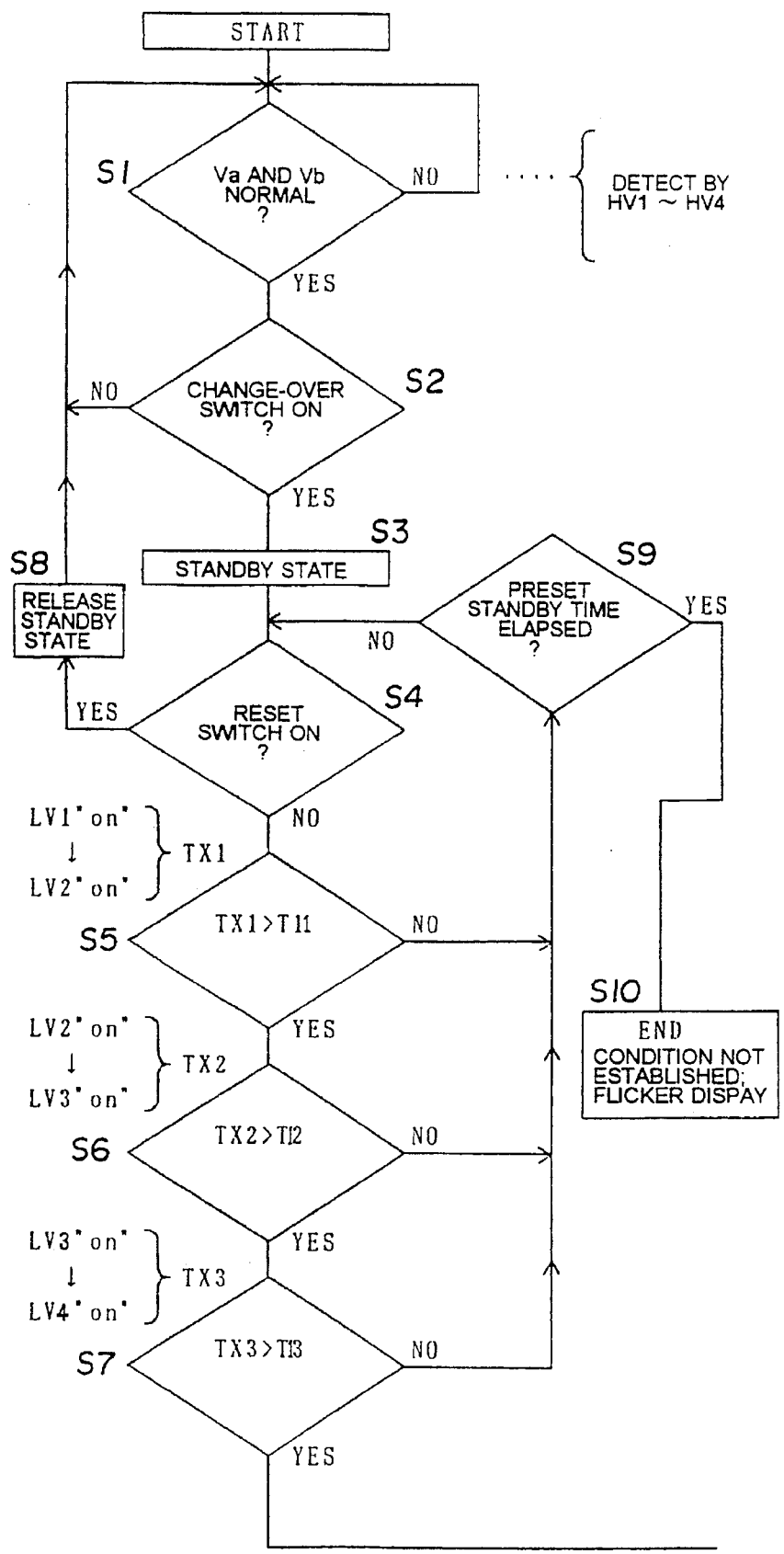
FIGS. 11 and 12 show a flowchart of a control routine for controlling an operation of the uninterruptible power switching apparatus according to the preferred embodiment.
Figure 12:
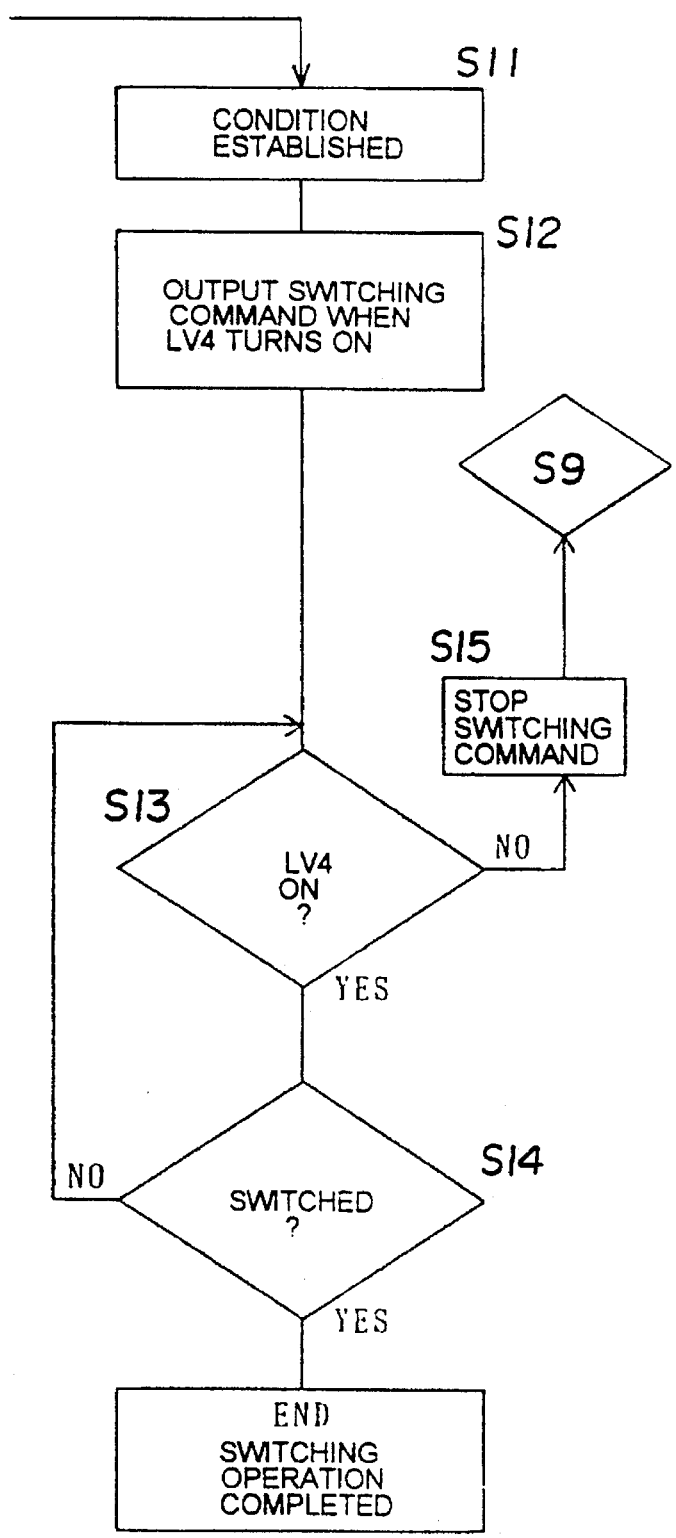

The uninterruptible power switching apparatus of this preferred embodiment is operated according to a flowchart shown in FIGS. 11 and 12.

First, at step S1, the PC 3 determines whether or not the voltages Va and Vb are both normal, that is, within the range defined by PH1 and PH2, based on presence or absence of the voltage-normal signals from the voltage detector units 7 and 8. If positive at step S1, step S2 checks whether a power change-over switch of the apparatus is pressed to be on. If positive at step S2, the routine proceeds to step S3 where the apparatus is set in a standby state for the power switching operation. In this state, if a reset switch is pressed at step S4, the standby state is released at step S8. In the standby state, through steps S5, S6 and S7, voltage values of the difference voltage Vd from the rectifier 10 which gradually decreases to approach substantially 0 (zero), that is, the minimum value, are detected by the low voltage detectors 11, 12, 13 and 14 (or LV1. LV2, LV3 and LV4) in turn, and it is determined whether the time intervals TX1, TX2 and TX3 are greater than preset values T11, T12 and T13, respectively. If the time intervals TX1, TX2 and TX3 are all greater than the preset values T11, T12 and T13, respectively, the PC 3 determines that a switching condition is satisfied or established, and outputs the switching command to the overlap-type change-over switch 1 at steps S11 and S12. On the other hand, if the switching condition is not satisfied, that is, if any one of steps S5, S6 and S7 yields negative answer, the routine proceeds to step S9 which checks whether a preset standby time has elapsed. If negative at step S9, steps S4 to S7 are repeated. On the other hand, if positive at step S9, the routine proceeds to step S10 which determines that the switching condition is not satisfied, and flickers a display to give notification to the outside.

After step S12, the routine proceeds to step S13 which checks whether LV4 (the low voltage detector 14) remains on. If positive at step S13, step S14 checks whether the switching is performed at the change-over switch 1. If positive at step S14, the routine terminates, that is, the switching operation is completed. On the other hand, if negative at step S14, steps S13 and S14 are repeated until step S14 yields positive answer or step S13 yields negative answer. If step S13 yields negative answer, that is, LV4 turns off before the switching is finished at the change-over switch 1, the PC 3 stops the switching command at step S15, and the routine returns to step S9.

As appreciated, in the foregoing preferred embodiment, the switching command is outputted to the change-over switch by predicting the synchronous point of the two power supplies which have a frequency difference within a preset range, through the operations of a plurality of the low voltage detectors 11, 12, 13 and 14, so as to operate the change-over switch 1 around the synchronous point. Accordingly, the switching between the two power supplies having different frequencies can be easily achieved without applying damage to either of the power supplies with the simple structure and thus at the low cost.

In the foregoing preferred embodiment, as described before, the change-over switch as disclosed in Japanese First (unexamined) Patent Publication No. 3-163716 may be used as the overlap-type change-over switch 1. Alternatively, the overlap-type change-over switch may be arranged such that two separate switches are connected to the power supplies, respectively, and the PC 3 switches between these switches after connecting both switches simultaneously for a given time period.

While the present invention has been described in terms of the preferred embodiment, the invention is not to be limited thereto, but can be embodied in various ways without departing from the principle of the invention as defined In the appended claims.

What is claimed is:

1. An uninterruptible power switching method for use with an overlap-type change-over switch which performs switching between two different power supplies without interruption after concurrent connection for a predetermined period of time, said method comprising the steps of:

monitoring voltages of said power supplies to issue voltage normal signals when said voltages are within preset ranges, respectively, detecting a difference voltage between said voltages using a low voltage detector which operates to issue an output signal when said difference voltage remains lower than a preset value for longer than a preset period, and issuing a switching command to said change-over switch when said voltage normal signals and said output signal are both issued.

2. An uninterruptible power switching method for use with an overlap-type change-over switch which performs switching between two different power supplies without interruption after concurrent connection for a predetermined period of time, said method comprising the steps of:

monitoring voltages of said power supplies to issue voltage normal signals when said voltages are within preset ranges, respectively, detecting a difference voltage between said voltages using a plurality of low voltage detectors each of which operates to issue an output signal when said difference voltage remains lower than a preset value for longer than a preset period, and issuing a switching command to said change-over switch when said voltage normal signals are issued, said low voltage detectors are all in operation, and time intervals between starts in operation of adjacent low voltage detectors are all longer than a preset period.

3. An uninterruptible power switching apparatus for use with overlap-type change-over switch which performs switching between two different power supplies without interruption after concurrent connection for a predetermined period of time, said apparatus comprising:

voltage detector units connected to said power supplies to monitor their voltages and issue voltage normal signals when said voltages are within preset ranges, respectively, a low voltage detector connected to said power supplies to detect a difference voltage between said voltages and operate to issue an output signal when said difference voltage remains lower than a preset value for longer than a preset period, and a controller connected to said voltage detector units and to said low voltage detector to issue a switching command to said change-over switch when said voltage normal signals and said output signal are both issued.

4. The uninterruptible power switching apparatus of claim 3, and further comprising two separate switches respectively connected to said power supplies in said overlap-type change-over switch, said two separate switches being responsive to said switching command so as to interconnect said power supplies for a given period of time.

5. An uninterruptible power switching apparatus for use with an overlap-type change-over switch which performs switching between two different power supplies without interruption after concurrent connection for a predetermined period of time, said apparatus comprising:

voltage detector units connected to power supplies to monitor their voltages and issue voltage normal signals when said voltages are within preset ranges, respectively, a plurality of low voltage detectors connected in parallel to each other, to said power supplies each to detect a difference voltage between said voltages and each operative to issue an output signal when said difference voltage remains lower than a preset value for longer than a preset period, and a controller connected to said voltage detector units and to said low voltage detectors to issue a switching command to said change-over switch when said voltage normal signals are issued, said low voltage detectors are all in operation, and time intervals between starts in operation of adjacent low voltage detectors are all longer than a preset period.

6. The uninterruptible power switching apparatus of claim 5, and further comprising two separate switches respectively connected to said power supplies in said overlap-type change-over switch, said two separate switches being responsive to said switching command so as to interconnect said power supplies for a given period of time.

* * * * *